(12) United States Patent
Chiu et al.

(10) Patent No.: US 10,473,302 B2
(45) Date of Patent: Nov. 12, 2019

(54) ILLUMINATION DEVICE AND INSTALLING METHOD THEREOF

(71) Applicant: Lite-On Technology Corporation, Taipei (TW)

(72) Inventors: Tsan-Li Chiu, Taipei (TW); Po-Chang Li, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 231 days.

(21) Appl. No.: 15/677,036

(22) Filed: Aug. 15, 2017

(65) Prior Publication Data

US 2019/0003687 A1 Jan. 3, 2019

(30) Foreign Application Priority Data

Jun. 29, 2017 (CN) .......................... 2017 1 0513474

(51) Int. Cl.
| | | |
|---|---|---|
| F21V 21/00 | (2006.01) | |
| F21V 17/10 | (2006.01) | |
| F21S 8/08 | (2006.01) | |
| B64C 39/02 | (2006.01) | |
| F21V 21/116 | (2006.01) | |
| F21W 131/103 | (2006.01) | |

(52) U.S. Cl.
CPC ............ *F21V 17/10* (2013.01); *B64C 39/024* (2013.01); *F21S 8/086* (2013.01); *F21V 21/116* (2013.01); *B64C 2201/108* (2013.01); *B64C 2201/12* (2013.01); *F21W 2131/103* (2013.01)

(58) Field of Classification Search
CPC ........ F21V 17/10; F21V 21/116; F21S 8/086; B64C 39/024; B64C 2201/108; B64C 2201/12; F21W 2131/103
USPC .................................................. 362/431, 254
See application file for complete search history.

(56) References Cited

U.S. PATENT DOCUMENTS

| | | | | |
|---|---|---|---|---|
| 7,311,421 | B1* | 12/2007 | Fahl ....................... | A47G 33/06 248/521 |
| 8,061,923 | B2* | 11/2011 | Simmons ................ | F16D 1/108 355/67 |
| 2012/0140468 | A1* | 6/2012 | Chang ....................... | F21S 2/00 362/235 |
| 2016/0010849 | A1* | 1/2016 | Snellenberger ..... | F21V 33/0084 362/119 |

* cited by examiner

*Primary Examiner* — Laura K Tso
(74) *Attorney, Agent, or Firm* — JCIPRNET

(57) ABSTRACT

An illumination device including a lamp and a light pole is provided. The lamp has a first assembling structure. The light pole has a second assembling structure. When the lamp moves closer to the light pole, the first assembling structure and the second assembling structure are automatically locked together by transmitting and receiving a signal. In addition, an installing method of an illumination device is also provided.

7 Claims, 7 Drawing Sheets

ILLUMINATION DEVICE AND INSTALLING METHOD THEREOF

CROSS-REFERENCE TO RELATED APPLICATION

This application claims the priority benefit of China application no. 201710513474.X, filed on Jun. 29, 2017. The entirety of the above-mentioned patent application is hereby incorporated by reference herein and made a part of this specification.

BACKGROUND OF THE INVENTION

Field of the Invention

The invention relates to an illumination device and an installing method thereof, and particularly relates to an illumination device that performs locking automatically and an installing method thereof.

Description of Related Art

In the conventional design of a street lamp, one side of the lamp is installed on the light pole so that the lamp may be fixed onto the light pole. Currently, the street lamp still depends on manual installing methods to screw the lamp to the light pole and to detach the lamp from the light pole for replacement or maintenance, thus resulting in problems of installation inefficiency. Besides, since the location to install the street lamp is higher than the ground, there is a potential risk in performing manual installation. Consequently, one of the important issues of the field is how to simplify the installing process of the street lamp and reduce installation time and risk.

SUMMARY OF THE INVENTION

The invention provides an illumination device and an installing method thereof that simplify the installing process of the illumination device and achieve the goal of decreasing installation time and reducing risk.

The illumination device of the invention includes a lamp and a light pole. The light includes a first assembling structure. The light pole includes a second assembling structure. When the lamp moves closer to the light pole, the first assembling structure and the second assembling structure are automatically locked together by transmitting and receiving a signal.

In an embodiment of the invention, one of the first assembling structure and the second assembling structure includes a first locking member, and the other one of the first assembling structure and the second assembling structure includes a second locking member, a motor, and a hooking member. The hooking member is assembled onto the motor and has a plurality of hooking portions.

In an embodiment of the invention, the first assembling structure and the second assembling structure are adapted to be assembled along a rectilinear direction so that the first locking member is assembled inside the second locking member; and the motor drives the hooking member to rotate so that the plurality of hooking portions engage with the first locking member respectively, thereby causing the second assembling structure to be automatically locked to the first assembling structure.

In an embodiment of the invention, when the first assembling structure and the second assembling structure are automatically locked together, the first locking member, the second locking member, and the hooking member are located on the same straight line.

In an embodiment of the invention, the first locking member is a plurality of bosses, and the second locking member is a plurality of slots.

In an embodiment of the invention, an inner diameter of one of the first assembling structure and the second assembling structure is greater than an outer diameter of the other one of the first assembling structure and the second assembling structure.

In an embodiment of the invention, transmitting and receiving the signal is through infrared, Bluetooth, or a wireless network.

The installing method of the illumination device of the invention includes the following steps: providing an unmanned aerial vehicle that has a holder; carrying a lamp by the unmanned aerial vehicle, wherein the holder of the unmanned aerial vehicle holds the lamp that includes a first assembling structure; moving the unmanned aerial vehicle that holds the lamp closer to a light pole, wherein the light pole has a second assembling structure; and automatically locking the first assembling structure of the lamp and the second assembling structure of the light pole together by transmitting and receiving a signal.

In an embodiment of the invention, when the unmanned aerial vehicle or the lamp transmits the signal, the light pole receives the signal; or when the light pole transmits the signal, the unmanned aerial vehicle or the lamp receives the signal.

In an embodiment of the invention, after the first assembling structure of the lamp and the second assembling structure of the light pole are automatically locked together, the unmanned aerial vehicle leaves the lamp.

In an embodiment of the invention, the unmanned aerial vehicle includes a quadcopter.

In an embodiment of the invention, the holder has two holding portions that are located on two ends of the holder respectively to hold the lamp.

In an embodiment of the invention, the holder is integrally formed with a portion of the unmanned aerial vehicle.

In an embodiment of the invention, the holder is fixed onto the unmanned aerial vehicle by means of magnetic attraction or locking.

Based on the above, according to the design of the illumination device of the invention, when the lamp moves closer to the light pole, the first assembling structure of the lamp and the second assembling structure of the light pole are automatically locked together by transmitting and receiving a signal. Consequently, in the illumination device of the invention, it is not necessary to install the lamp and the light pole manually; instead, the lamp and the light pole may be automatically locked together by transmitting and receiving a signal, thereby greatly simplifying the installing process and achieving the goal of decreasing assembly time and reducing risk.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1A:
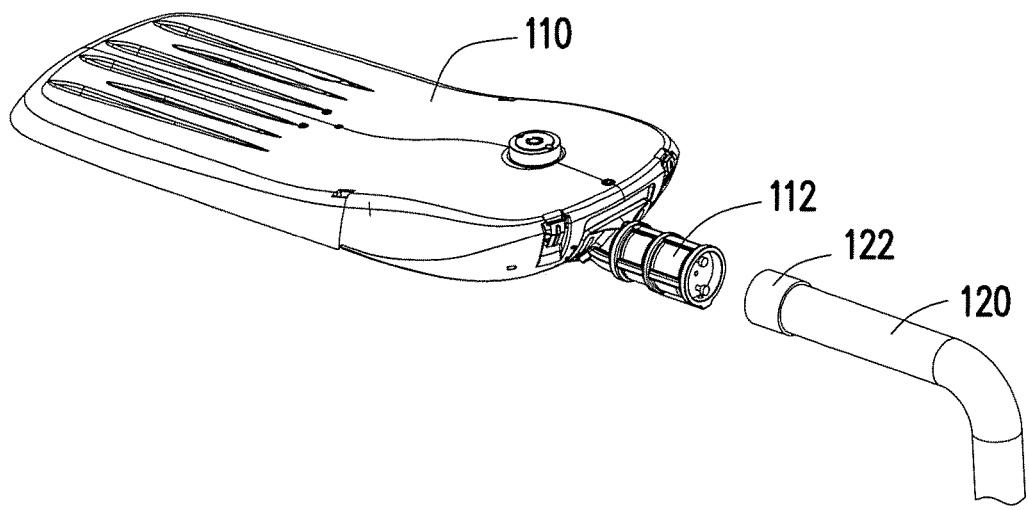
FIG. 1A illustrates a schematic three-dimensional exploded view of an illumination device according to an embodiment of the invention.
Figure 1B:
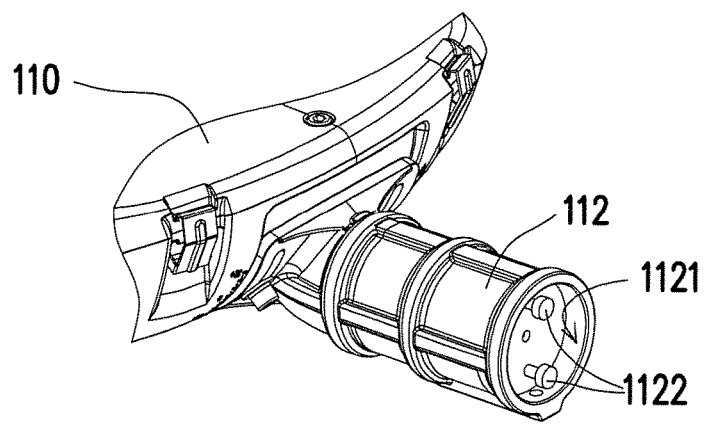
FIG. 1B illustrates a schematic three-dimensional enlarged view of the first assembling structure of FIG. 1A.
Figure 1C:
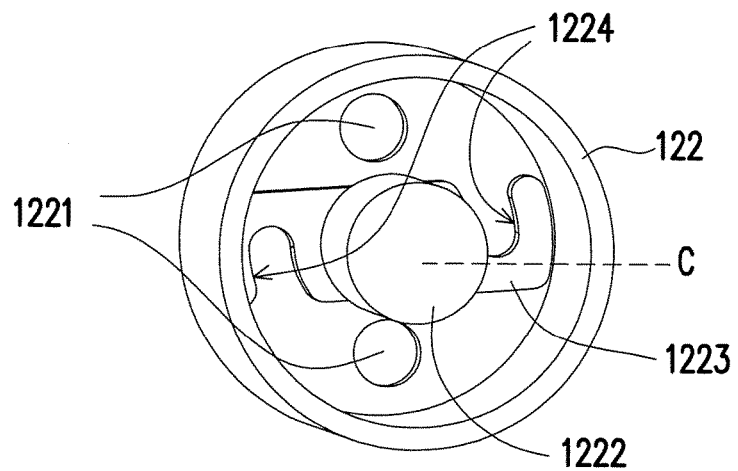
FIG. 1C illustrates a schematic three-dimensional enlarged view of the second assembling structure of FIG. 1A.
Figure 1D:
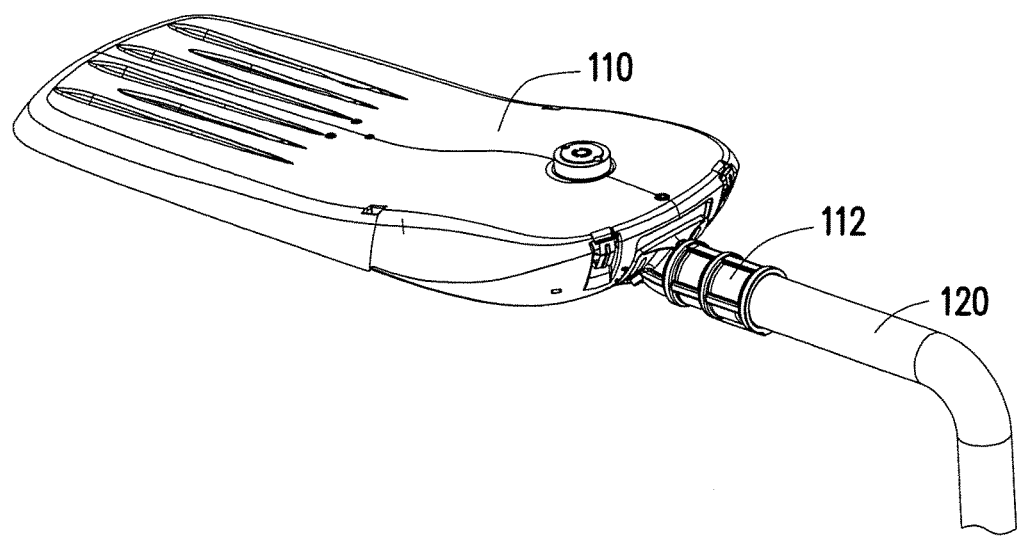
FIG. 1D illustrates a schematic three-dimensional assembly view of the illumination device of FIG. 1A.

FIG. 1A illustrates a schematic three-dimensional exploded view of an illumination device according to an embodiment of the invention. FIG. 1B illustrates a schematic three-dimensional enlarged view of the first assembling structure of FIG. 1A. FIG. 1C illustrates a schematic three-dimensional enlarged view of the second assembling structure of FIG. 1A. FIG. 1D illustrates a schematic three-dimensional assembly view of the illumination device of FIG. 1A.

With reference to FIG. 1A and FIG. 1D simultaneously first, in this embodiment, an illumination device 100 includes a lamp 110 and a light pole 120. The lamp 110 includes a first assembling structure 112. The light pole 120 includes a second assembling structure 122. In particular, when the lamp 110 moves closer to the light pole 120, the first assembling structure 112 and the second assembling structure 122 are automatically locked together by transmitting and receiving a signal. Herein the illumination device 100 is embodied to be a street light device, but the invention is not limited thereto.

Specifically, with reference to FIG. 1B, the lamp 110 has a function of illumination. The first assembling structure 112 of the lamp 110 includes a containing space 1121 and a first locking member, such as a plurality of bosses 1122. The first assembling structure 112 is located at one end of the lamp 110 and extends outwardly rectilinearly, and the number of the bosses 1122 is embodied to be two for the purpose of illustration. Herein the bosses 1122 are located in the containing space 1121 and are spaced apart from each other.

Furthermore, with reference to FIG. 1C, the light pole 120 has a function of fixing the lamp 110. The second assembling structure 122 of the light pole 120 includes a second locking member (such as a plurality of slots 1221), a motor 1222, and a hooking member 1223. The slots 1221 are perforations that pass through the second assembling structure 122, and the number of the slots 1221 corresponds to the number of the bosses 1122 of the first assembling structure 112. The motor 1222 is located between the slots 1221, and uses a central axis C of the second assembling structure 122 as a pivoting center. The hooking member 1223 is assembled onto the motor 1222 and has a plurality of hooking portions 1224. The bosses 1122 of the first assembling structure 112 may be positioned inside the slots 1221 of the second assembling structure 122, and the motor 1222 of the second assembling structure 122 may drive the hooking member 1223 to rotate so that the hooking portions 1224 engage with the bosses 1122 respectively, thereby causing the second assembling structure 122 to be automatically locked to the first assembling structure 112.

In this embodiment, the first assembling structure 112 is embodied to include the first locking member (i.e. the bosses 1122), and the second assembling structure 122 is embodied to include a combination of the second locking member (i.e. the slots 1221), the motor 1222, and the hooking member 1223, but the invention is not limited thereto. In other embodiments that are not shown herein, it is also possible for the second assembling structure to include the first locking member (i.e. the bosses) and for the first assembling structure to include the combination of the second locking member (i.e. the slots), the motor, and the hooking member, and such configuration still belongs to the scope that the invention seeks to protect.

In the following, further explication is provided to illustrate the automatic locking process of the first assembling structure 112 of the lamp 110 and the second assembling structure 122 of the light pole 120, i.e. the installing method of the illumination device 100.

FIG. 2A to FIG. 2E are schematic three-dimensional views illustrating an installing method of the illumination device of FIG. 1A. FIG. 3A to FIG. 3D are schematic three-dimensional views illustrating the illumination device of FIG. 2D in the automatic locking process from another angle.

Figure 2A:
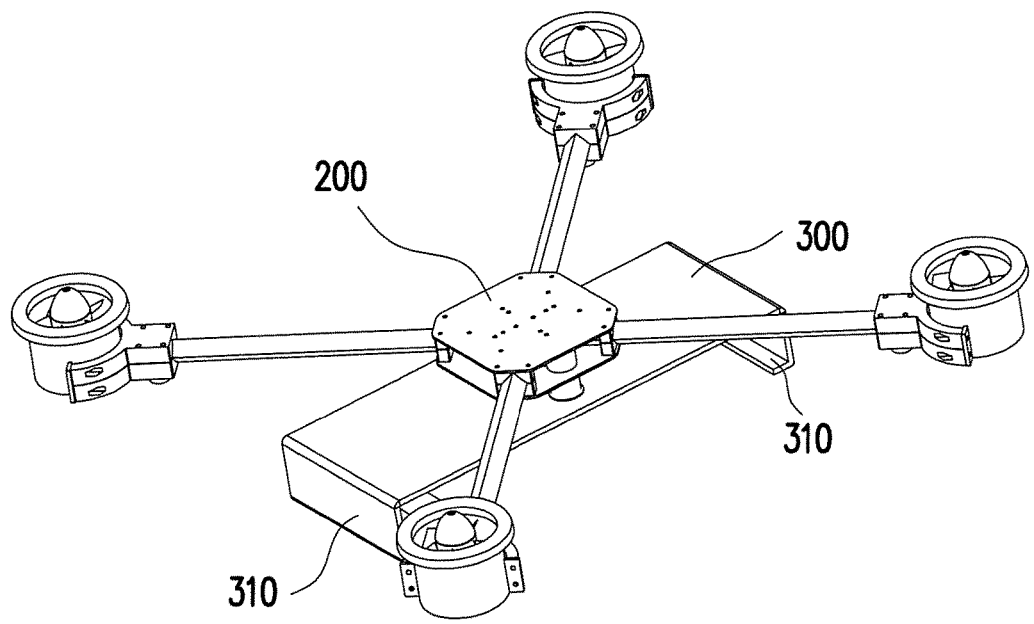
FIG. 2A to FIG. 2E are schematic three-dimensional views illustrating an installing method of the illumination device of FIG. 1A.

With reference to FIG. 2A first, in this embodiment, the installing method of the illumination device includes the following steps: first, an unmanned aerial vehicle 200 is provided, and herein the unmanned aerial vehicle 200 has a holder 300. The unmanned aerial vehicle 200 is, for example, a quadcopter, and the holder 300 has two holding portions 310 that are located on two ends of the holder 300 respectively. Herein, the holder 300 may be integrally formed with a portion of the unmanned aerial vehicle 200, or the holder 300 may be fixed onto the unmanned aerial vehicle 200 by means of magnetic attraction or by other non-manual locking methods. The invention is not limited thereto.

Figure 2B:
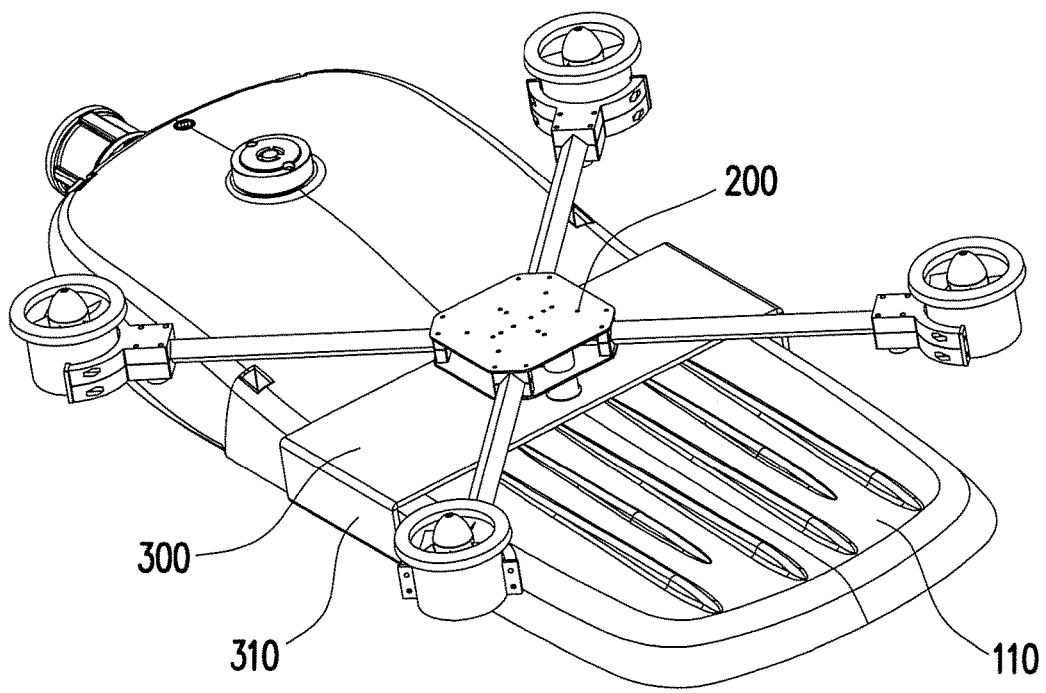

Then, with reference to FIG. 2B, the unmanned aerial vehicle 200 is used to carry the lamp 110. Herein the unmanned aerial vehicle 200 holds the lamp 110 by the holding portions 310 of the holder 300 so as to carry the lamp 110 to fly together.

Figure 2C:
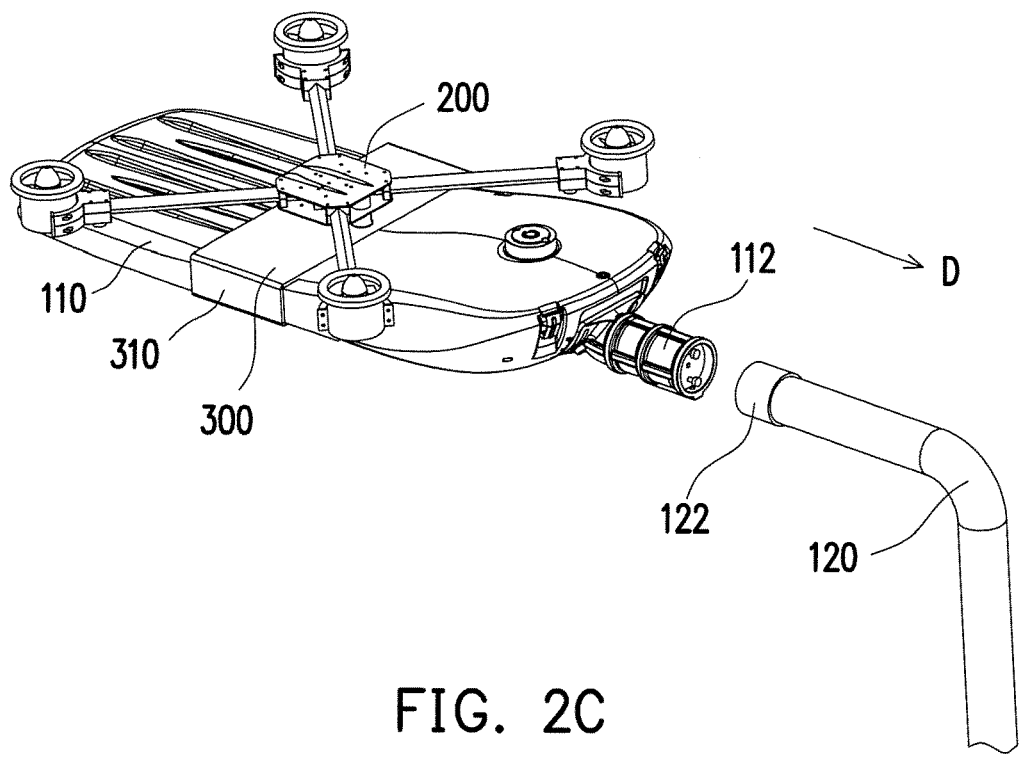

Then, with reference to FIG. 2C, the unmanned aerial vehicle 200 carrying the lamp 110 is made to move closer to the light pole 120.

Figure 2D:
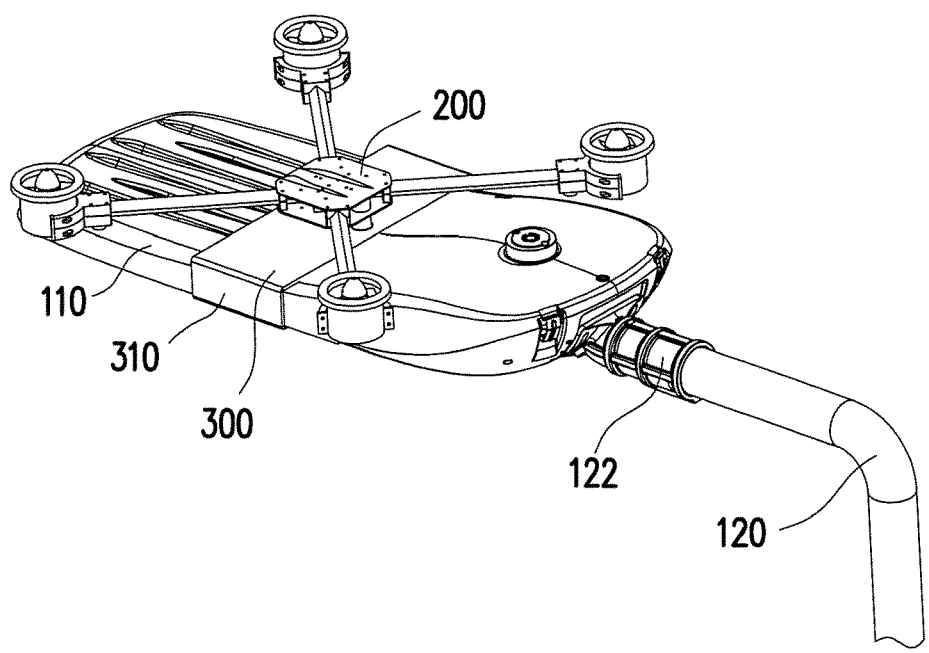

Afterwards, with reference to FIG. 2D, by transmitting and receiving a signal, the first assembling structure 112 of the lamp 110 and the second assembling structure 122 of the light pole 120 are automatically locked together. Specifically, with reference to FIG. 2D and FIG. 3A, if the unmanned aerial vehicle 200 carrying the lamp 110 moves relatively closer to the light pole 120, such as within ten meters from the light pole 120, when the unmanned aerial vehicle 200 or the lamp 110 transmits a signal, the light pole 120 receives the signal; or when the light pole 120 transmits a signal, the unmanned aerial vehicle 200 or the lamp 110 receives the signal. For example, the unmanned aerial vehicle 200 begins to transmit a signal to notify the light pole 120 within ten meters of the periphery of the light pole 120, and the light pole 120, after receiving the signal, turns on the motor 1222 of the second assembling structure 122 to prepare to automatically lock the first assembling structure 112. Herein the signal may be transmitted and received by using signal transmission protocols such as infrared, Bluetooth, or Wi-Fi, but the invention is not limited thereto.

Figure 3A:
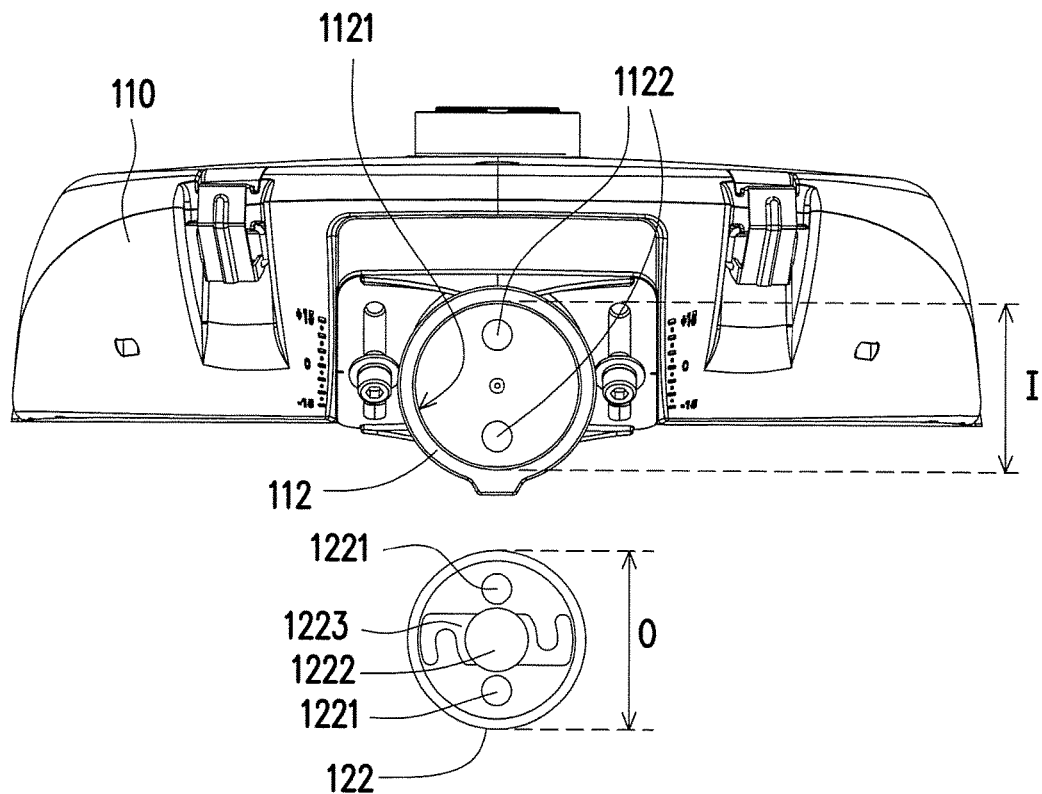
FIG. 3A to FIG. 3D are schematic three-dimensional views illustrating the illumination device of FIG. 2D in the automatic locking process from another angle.
Figure 3B:
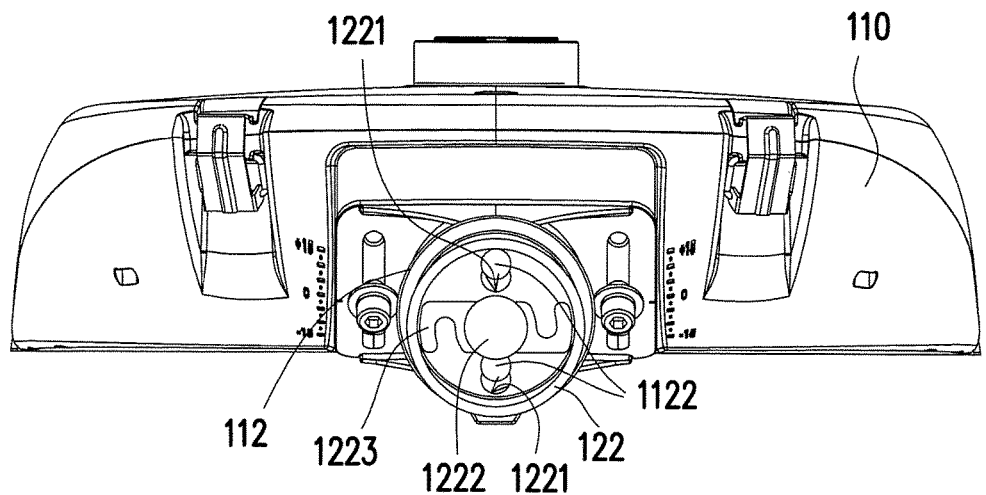

With reference to FIG. 3B, when the lamp 110 gradually moves closer and comes into contact with the light pole 120, the first assembling structure 112 and the second assembling structure 122 are assembled along a rectilinear direction D (please refer to FIG. 2C), and an inner diameter of one of the first assembling structure 112 and the second assembling structure 122 is greater than an outer diameter of the other one of the first assembling structure 112 and the second assembling structure 122. Herein, an inner diameter I of the first assembling structure 112 is greater than an outer diameter O of the second assembling structure 122 so that the first assembling structure 112 is sleeved to the second assembling structure 122. As shown in FIG. 3D, the bosses 1122 of the first assembling structure 112 are positioned inside the slots 1221 of the second assembling structure 122 respectively.

Figure 3C:
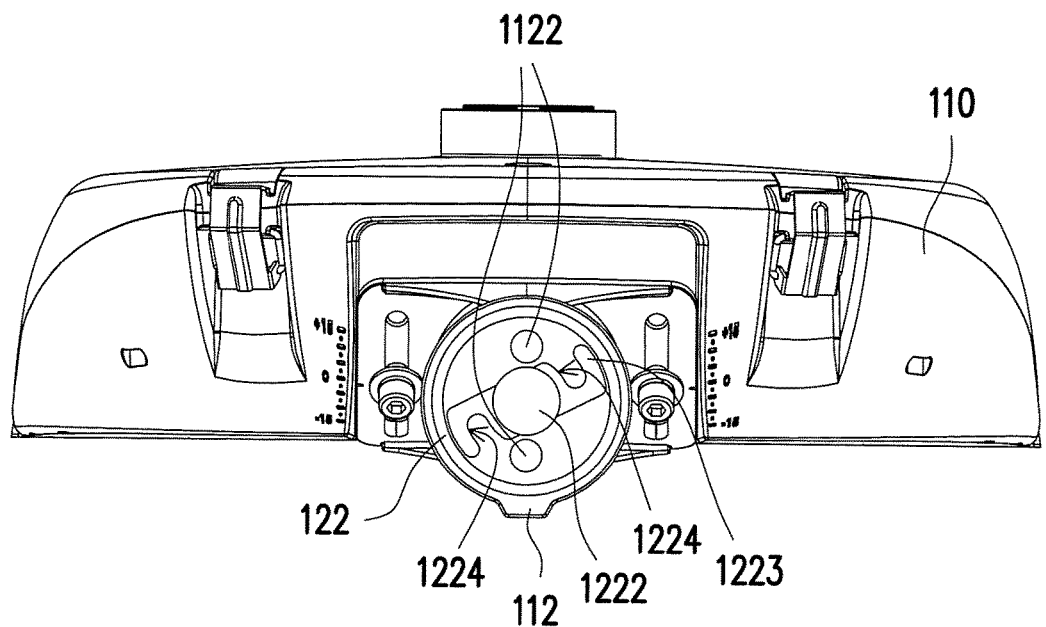
Figure 3D:
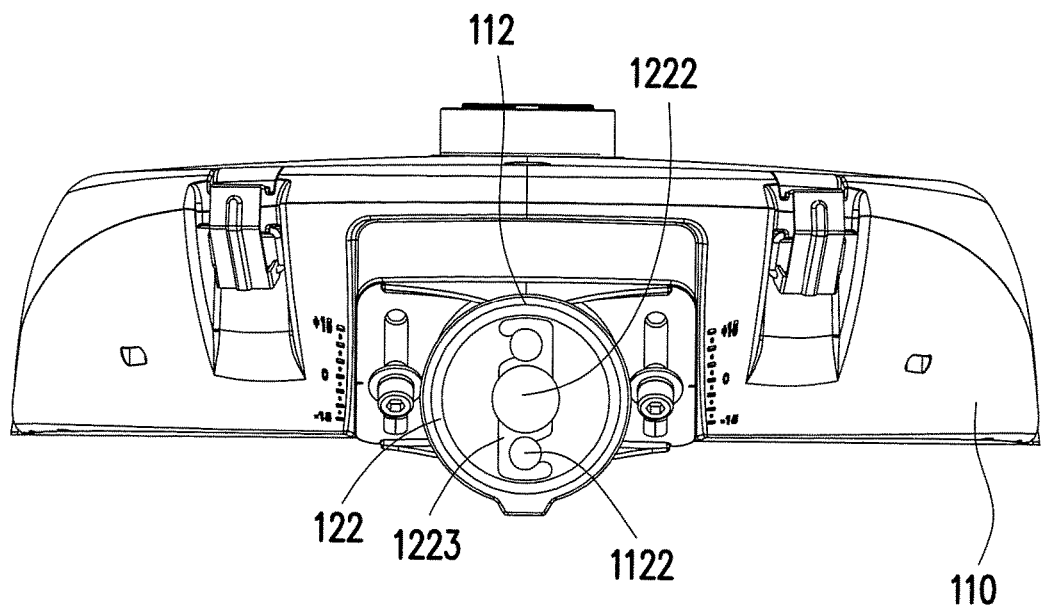

Afterwards, with reference to FIG. 3C and FIG. 3D simultaneously, the motor 1222 drives the hooking member 1223 to rotate so that the hooking portions 1224 engage with the bosses 1122 of the first assembling structure 112 respectively, thereby causing the second assembling structure 122 to be automatically locked to the first assembling structure 112. When the first assembling structure 112 and the second assembling structure 122 are automatically locked together, the first locking member (i.e. the bosses 1122) of the first assembling structure 112 and the second locking member (i.e. the slots 1221) and the hooking member 1223 of the second assembling structure 122 are located on the same straight line.

Figure 2E:
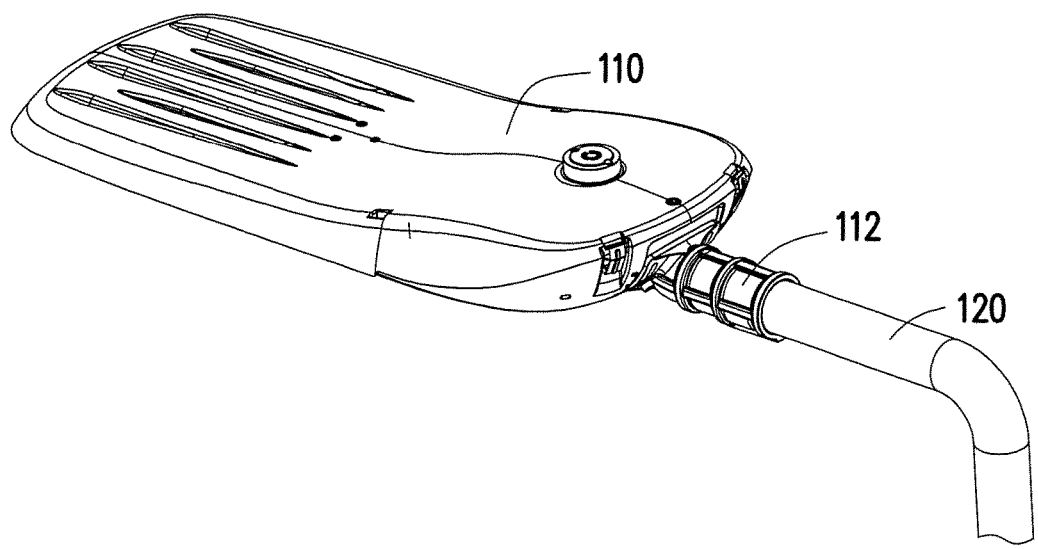

Lastly, with reference to FIG. 2E, after the first assembling structure 112 of the lamp 110 and the second assembling structure 122 of the light pole 120 are automatically locked together, the unmanned aerial vehicle 200 and the holder 300 leaves the lamp 110 to complete the installing process of the illumination device 100.

In summary of the above, according to the design of the illumination device of the invention, when the lamp moves closer to the light pole, the first assembling structure of the lamp and the second assembling structure of the light pole are automatically locked together by transmitting and receiving a signal. Consequently, in the illumination device of the invention, it is not necessary to install the lamp and the light pole manually; instead, the lamp and the light pole may be automatically locked together by transmitting and receiving a signal, thereby greatly simplifying the installing process and achieving the goal of decreasing assembly time and reducing risk. Besides, in the installing method of the illumination device of the invention, the unmanned aerial vehicle is used to replace conventional steps of manual installation, thereby saving labor and reducing processing steps and installation time.

Although the embodiments are already disclosed as above, these embodiments should not be construed as limitations on the scope of the invention. It will be apparent to those skilled in the art that various modifications and variations can be made to the disclosed embodiments without departing from the scope or spirit of this invention. In view of the foregoing, it is intended that the invention covers modifications and variations provided that they fall within the scope of the following claims and their equivalents.

What is claimed is:

1. An illumination device, comprising:
   a lamp, comprising a first assembling structure; and
   a light pole, comprising a second assembling structure, wherein when the lamp moves closer to the light pole, the first assembling structure and the second assembling structure are automatically locked together by transmitting and receiving a signal.

2. The illumination device as recited in claim 1, wherein one of the first assembling structure and the second assembling structure comprises a first locking member; and the other one of the first assembling structure and the second assembling structure comprises a second locking member, a motor, and a hooking member, wherein the hooking member is assembled onto the motor and has a plurality of hooking portions.

3. The illumination device as recited in claim 2, wherein the first assembling structure and the second assembling structure are adapted to be assembled along a rectilinear direction so that the first locking member is assembled inside the second locking member, and the motor drives the hooking member to rotate so that the plurality of hooking portions engage with the first locking member respectively, thereby causing the second assembling structure to be automatically locked to the first assembling structure.

4. The illumination device as recited in claim 2, wherein when the first assembling structure and the second assembling structure are automatically locked together, the first locking member, the second locking member, and the hooking member are located on the same straight line.

5. The illumination device as recited in claim 2, wherein the first locking member is a plurality of bosses, and the second locking member is a plurality of slots.

6. The illumination device as recited in claim 1, wherein an inner diameter of one of the first assembling structure and the second assembling structure is greater than an outer diameter of the other one of the first assembling structure and the second assembling structure.

7. The illumination device as recited in claim 1, wherein transmitting and receiving the signal is through infrared, Bluetooth, or a wireless network.

* * * * *